3,014,002
WAX COATING AND LAMINATING COMPOSITION AND SHEET MATERIAL COATED AND LAMINATED THEREWITH
William S. Beggs, Havertown, Pa., assignor to The Atlantic Refining Company, Philadelphia, Pa., a corporation of Pennsylvania
No Drawing. Filed Sept. 3, 1959, Ser. No. 837,787
6 Claims. (Cl. 260—28.5)

This invention relates to a wax coating and laminating composition for sheet materials and to coated and laminated sheet materials employing such composition. More particularly, this invention is concerned with a wax coating and laminating composition containing a relatively high percentage of a high melting point microcrystalline wax together with certain other specific components to modify the characteristics of the microcrystalline wax, thereby rendering it suitable for coating and laminating sheet material.

Heretofore wax containing compositions have been developed for coating the surface of a base sheet of paper, foil, regenerated cellulose, cardboard, paperboard, or similar sheet materials or for intercalating between two or more layers of any such flexible base sheets as a laminant composition. It is necessary that the coating or laminating compositions have certain physical properties which, when combined with the properties of the base sheet material, will provide a combination suitable for packaging a wide variety of materials. Ideally the wax composition provides a moisture and moisture vapor barrier and, in addition, provides an adhesive or sealing action which renders the sheet material coated or laminated therewith exceedingly useful in packaging. In particular, paraffin waxes and microcrystalline waxes either alone or in combination with various modifying components have been employed as the wax coating or laminating composition.

Microcrystalline waxes, which are sometimes designated as amorphous or petrolatum waxes, have been proposed for use as a wax coating or laminating composition in the production of coated or laminated sheet material useful for packaging since such waxes have greater flexibility, adherence to the sheet material, and better sealing qualities than paraffin waxes. The microcrystalline waxes suitable are those having a low melting point of the order of 145° F. to 160° F. These waxes, however, can be produced only from certain crude sources and by certain processing methods and therefore are limited as to supply. Large quantities of high melting point microcrystalline waxes are available, but such waxes lack flexibility and, in addition, lack laminating or sealing strength. Heretofore, it has been proposed to obtain flexibility by adding oils to such waxes, however, such compositions have not been particularly successful since they have shown poor laminating or sealing strength.

A composition now has been found which employs a high melting point microcrystalline wax and which shows superior laminating or sealing strength and low temperature flexibility.

It is an object of this invention to provide an improved coating and laminating composition for sheet material containing a high melting point microcrystalline wax.

It is another object of this invention to provide a coating and laminating composition for sheet material having superior laminating strength and low temperature flexibility utilizing a high melting point microcrystalline wax.

It is another object of this invention to provide a sheet material having a high melting point microcrystalline wax film either as a coating or as a laminant composition which composition has improved adhesion to the sheet material.

It is another object of this invention to provide a sheet material having a high melting point microcrystalline wax film either as a coating or as a laminant composition which composition has superior low temperature flexibility.

Additional objects will be apparent from the following description of the invention and the claims.

In accordance with this invention the properties of a high melting point microcrystalline wax are modified by incorporating in the wax certain specific quantities of a microcrystalline wax of low melting point and a low viscosity index selective solvent extract distillate oil. In a more specific embodiment of the invention the composition is modified further by the addition of high molecular weight isobutylene polymers.

The high melting point microcrystalline wax constitutes the major portion of the wax compositions of this invention. The microcrystalline waxes particularly suitable as the major component have a melting point of from 170° F. to 185° F. as measured by ASTM Method D 127. Preferably the melting point should range between 172° F. to 182° F. These preferred waxes are further characterized by having a viscosity in the range between 70 to 85 Saybolt seconds Universal at 210° F. as measured by the ASTM Method D 446, an oil content of not more than about 1 percent as measured by the ASTM Method D 721, and a penetration at 77° F. of from 9 to 17 as measured by ASTM Method D 1321. In general, however, it is sufficient to characterize the microcrystalline waxes suitable for this invention by the melting point only.

The high melting point microcrystalline wax is modified with a minor proportion of a microcrystalline wax of low melting point such as those prepared by the solvent dewaxing and deoiling of Mid-Continent residuum stocks. The low melting point microcrystalline wax preferably has a melting point ranging from 145° F. to 160° F., a viscosity of from 80 to 90 Saybolt seconds Universal at 210° F., an oil content of not more than about 1.5 percent and a penetration at 77° F. of from about 23 to 30.

The superior low temperature flexibility characteristics of the wax composition of this invention are obtained by incorporating into the composition a low viscosity index oil comprised predominantly of alkylated aromatics, condensed ring aromatics and cycloparaffins. Such oils are obtained as the intermediate cut from the vacuum distillation of the extract oil obtained by the selective solvent extraction of a petroleum lubricating oil fraction. The petroleum lubricating oil fraction may be subjected to any one of the conventional solvent extraction treatments employing such selective solvents as nitrobenzene, phenol, furfural, 2,2'-dichloroethylether, and similar selective solvents. The extract oil from such selective solvent treatment of lubricating oil stocks is vacuum distilled to produce an overhead fraction, an intermediate cut, and a bottoms fraction. The overhead fraction generally constitutes from 5 percent by volume to 8 percent by volume and the intermediate fraction from 80 percent by volume to 85 percent by volume of the total extract oil fraction.

If it is desired to produce a finished wax composition having a particularly light color, the vacuum distillation of the extract oil may be carried out in the presence of an aqueous sodium hydroxide solution. Preferably from 180 to 190 volumes of the oil are vacuum distilled in the presence of 1 volume of an aqueous sodium hydroxide solution containing about 50 weight percent sodium hydroxide. This vacuum distillation over caustic functions to reduce the color of the intermediate cut or fraction, and thus the color of the final composition is likewise reduced.

The intermediate fraction containing alkylated aromatics, condensed ring aromatics and cycloparaffins is particularly suitable for the composition of this invention. Such oil fraction is characterized by having a color ranging between 5 and 6½ as measured by the ASTM Method D 155 (4¼ to 4½ when the distillation is carried out in the presence of aqueous sodium hydroxide as described), a viscosity of from 1,850 to 2,500 Saybolt seconds Universal at 100° F., and from 80 to 100 Saybolt seconds Universal at 210° F., a viscosity index not in excess of about 25, and a pour point not in excess of about 15° F.

This oil functions to improve the low temperature flexibility characteristics of the final composition and also to improve the adhesiveness and tackiness of the final composition.

It is sometimes desirable to employ a wax composition having an exceedingly high laminating strength. When such a composition is desired, the composition comprising the high melting point microcrystalline wax, the low melting point microcrystalline wax and the selective solvent extract distillate oil may be further modified by the addition thereto of limited amounts of high molecular weight isobutylene polymers. The isobutylene polymers function as a tackiness improver such that the final wax composition has the desired high laminating strength.

The isobutylene polymer mixture preferably employed in the composition is a solid rubbery-like material having an average molecular weight range of from 117,000 to 135,000 as calculated by the Staudinger formula expressing molecular weight as a linear function of intrinsic viscosity. This material is available commercially as Vistanex L-140.

In preparing the wax compositions of this invention it is preferable to blend the desired quantity of selective solvent extract oil with the desired quantities of the microcrystalline waxes at a temperature at which the waxes will be in a melted condition. When it is desired to employ isobutylene polymers in the composition a modified method of preparation is desirable. Such compositions are prepared by milling one part by weight of the solid isobutylene polymer with two parts by weight of the high melting point microcrystalline wax and thereafter adding additional melted high melting point microcrystalline wax to the milled product under high shear conditions such that about a 5 percent by weight concentrate of isobutylene polymer in the high melting point microcrystalline wax is produced. This concentrate of isobutylene polymer in the high melting point microcrystalline wax is held at a temperature above the melting point of the mixture and additional melted high melting point microcrystalline wax, low melting point microcrystalline wax, and selective solvent distillate oil added to produce the desired blend.

It has been found by the production of a large number of compositions employing a statistical design pattern that a certain critical range of quantities of each of the aforementioned components of the wax composition is required in order to produce a coating and laminating composition which will provide superior laminating strength and superior low temperature flexibility. In order to provide a means of evaluating various compositions two tests were developed, one for measuring laminating strength and the other for measuring low temperature flexibility.

In order to measure the laminating strength of the wax composition a 1 inch wide strip of cellophane (regenerated cellulose, du Pont 300 PT plain transparent cellophane) about four inches long is coated with the wax composition desired to be tested. This is placed on a slightly wider sheet or strip of the same cellophane sheet material with the waxed side of the 1 inch strip against the unwaxed cellophane sheet. A hot iron at a temperature of about 400° F. is passed over the upper surface of the two strips in order to melt the wax intercalated between the two cellophane sheets which causes the upper strip to adhere to the under sheet. Thereafter, the force required to separate the 1 inch strip from the under sheet is measured and expressed in grams per inch, the strips being pulled apart at the rate of 12½ inches per minute and the test conducted at a temperature of 73° F. under 50 percent relative humidity conditions. Only those compositions which had a laminating strength of 210 grams per inch or more were considered to be suitable for the purposes of this invention.

In order to measure the low temperature flexibility of the composition of this invention, 18-inch strips 1-inch wide are cut from 52-pound kraft paper. These strips are dipped twice into the melted wax composition under test, with the strip allowed to cool and dry between the first and second dip. The temperature of the melted wax composition is adjusted such that after cooling and drying following the second dip the total thickness of the wax and paper ranges between 0.0035 inch and 0.0040 inch. A 100-gram weight is fastened to one end of the strip and the other end of the strip is fastened tangentially to the curved surface of a 3-inch diameter cylinder. This entire apparatus is placed in an air bath which can be adjusted to any desired temperature.

The strip is then wound around the cylinder and the highest temperature at which cracks appear in the wax coating on the paper is noted as the flexibility cracking temperature. For the purposes of this invention those compositions which cracked at temperatures above 15° F. were considered to be unsuitable. Preferably the composition should have a flexibility cracking temperature below 0° F.

By applying these tests to a large number of wax compositions in which the quantities of the various components were varied according to a statistical design the range of quantities for each component was obtained which would give finished compositions having the desired laminating strength and low temperature flexibility. It was found that the quantity of the low melting point microcrystalline wax should range from 4.0 weight percent to 20.0 weight percent based on the total weight of the composition and the selective solvent extract distillate oil from 10.0 weight percent to 17.0 weight percent based on the total weight of the composition, with the high melting point microcrystalline wax constituting the remainder of the composition.

Coating and laminating compositions wherein the laminating strength of the composition was in excess of 230 grams per inch and preferably above 310 grams per inch and the flexibility cracking temperature below about 0° F. could be produced when a quantity of isobutylene polymer ranging from 0.4 weight percent to 1.6 weight percent, based on the total weight of the composition, was incorporated in the composition.

The following examples are provided to demonstrate the utility of the compositions of this invention as coating and laminating agents. In addition, these examples will serve to illustrate certain specific embodiments of the invention and demonstrate the criticality of each component of the composition and the quantities thereof.

A number of wax compositions were prepared using various quantities of the components of this invention and were tested as described above. The low melting point microcrystalline wax employed in the compositions of the examples had an ASTM color as measured by the Method D 155 of 1¾, a viscosity of 88.5 Saybolt seconds Universal at 210° F., a melting point of 146° F., an oil content of 1.2 percent, and a penetration at 77° F. of 26.8.

The extract distillate oil employed in the compositions of Example I was an intermediate cut obtained by the vacuum distillation in the persence of aqueous sodium hydroxide of the extract fraction produced by the conventional nitrobenzene solvent extraction of a commercial lubricating oil distillate fraction. The vacuum distillation was carried out by charging about 182 volumes of the extract oil fraction and one volume of aqueous sodium hydroxide solution containing about 50 weight percent of sodium hydroxide to a batch vacuum still and distilling at a pressure of from 1.4 to 2.0 mm. of mercury. An overhead cut comprising 5.0 volume percent of the total extract oil was discarded, an intermediate fraction comprising 83.5 volume percent of the total extract oil was retained and the bottoms fraction was discarded. The intermediate fraction had a color of 4¼–4½ (ASTM, D 155), a viscosity of 2,436 Saybolt seconds Universal at 100° F. and 89.7 Saybolt seconds Universal at 210° F., a viscosity index of −30 and a pour point of 25° F.

The selective solvent extract distillate oil employed in the compositions of Example II was an intermediate cut obtained by the vacuum distillation of the extract fraction produced by the conventional nitrobenzene solvent extraction of a lubricating distillate oil fraction slightly different from that of Example I. The intermediate fraction, comprising an approximately 80 volume percent fraction, had an ASTM color of 6, a viscosity of 2,009 Saybolt seconds Universal at 100° F., and 92.5 Saybolt seconds Universal at 210° F., a viscosity index of +19 and a pour point of 10° F.

The isobutylene polymer employed in the compositions of Example II had an average molecular weight range of from 117,000 to 135,000.

The high melting point microcrystalline wax employed in the examples had an ASTM color of 1¾, a viscosity of 73.5 Saybolt seconds Universal at 210° F., a melting point of 175° F., an oil content of 1.0 percent and a penetration at 77° F. of 13.

EXAMPLE I

A number of compositions were prepared employing the high melting point microcrystalline wax, modified with various amounts of the low melting point microcrystalline wax and the extract distillate oil. The quantities of components in each of the compositions together with the laminating strength and flexibility cracking temperatures of the composition are set forth in Table I.

Table I

| Comp. No. | Quantities of Components | | | Properties of the Compositions | |
|---|---|---|---|---|---|
| | Low M.P. Micro-crystalline Wax | Extract Distillate Oil | High M.P. Micro-crystalline Wax | Laminating Strength, grams/inch | Flexibility Cracking Temp., ° F. |
| 1 | 5.0 | 10.0 | 85.0 | 220 | −4 |
| 2 | 5.0 | 13.0 | 82.0 | 305 | −10 |
| 3 | 5.0 | 16.0 | 79.0 | 235 | −18 |
| 4 | 10.0 | 13.0 | 77.0 | 225 | −10 |
| 5 | 10.0 | 16.0 | 74.0 | 210 | −16 |
| 6 | 15.0 | 13.0 | 72.0 | 210 | −13 |
| 7 | 20.0 | 10.0 | 70.0 | 260 | −5 |
| 8 | 0.0 | 10.0 | 90.0 | 155 | +5 |
| 9 | 10.0 | 7.0 | 83.0 | 95 | +8 |
| 10 | 20.0 | 0.0 | 80.0 | 30 | +61 |
| 11 | 20.0 | 5.0 | 75.0 | 105 | +16 |
| 12 | 0.0 | 0.0 | 100.0 | 20 | +65 |

It will be noted that compositions 1 to 7 inclusive are illustrative of those suitable as coating and laminating agents in accordance with the objects of this invention. It will also be seen that the quantities of the components fall within the critical ranges specified. Composition 8 shows the effect of omitting the low melting point microcrystalline wax from the composition. It will be seen that although the flexibility cracking temperature is relatively low, the laminating strength is completely inferior. Composition 9 demonstrates the effect of employing less than the critical amount of extract distillate oil. The laminating strength of this composition is completely unsatisfactory. Composition 10 demonstrates the effect of omitting the extract distillate oil. The laminating strength is exceedingly low and the flexibility cracking temperature exceedingly high. Composition 11 shows the effect of using too small a quantity of extract distillate oil although the other components are within the desired range. Composition 12 which is the unmodified high melting point microcrystalline wax is included for purposes of comparison. It will be seen that this material has little or no utility as a coating or laminating agent.

The compositions of this invention are exceedingly light colored, generally having an ASTM color of about 2¼ to 2½.

EXAMPLE II

A number of compositions were prepared wherein the high melting point microcrystalline wax was modified by the incorporation therein of various quantities of the low melting point microcrystalline wax, extract distillate oil, and isobutylene polymer as described. The quantities of components in each of the compositions together with the laminating strength and flexibility cracking temperatures of the compositions are set forth in Table II.

Table II

| Comp. No. | Quantities of Components | | | | Properties of the Compositions | |
|---|---|---|---|---|---|---|
| | Isobutylene Polymer | Low M.P. Micro-crystalline wax | Extract Distillate Oil | High M.P. Micro-crystalline wax | Laminating Strength, grams/inch | Flexibility Cracking Temp., ° F. |
| 13 | 1.3 | 16.1 | 12.9 | 69.7 | 310 | −3 |
| 14 | 1.3 | 16.1 | 14.8 | 67.8 | 305 | −10 |
| 15 | 1.5 | 18.5 | 14.8 | 65.2 | 340 | −13 |
| 16 | 0.4 | 4.1 | 12.9 | 82.6 | 230 | −3 |
| 17 | 0.4 | 16.1 | 12.9 | 70.6 | 250 | −8 |
| 18 | 1.3 | 4.1 | 12.9 | 81.7 | 230 | +1 |
| 19 | 0.8 | 10.1 | 16.1 | 73.0 | 340 | −8 |
| 20 | 0.8 | 10.1 | 8.1 | 81.0 | 135 | +22 |
| 21 | 1.3 | 4.1 | 3.3 | 91.3 | 45 | +60 |
| 22 | 0.1 | 10.1 | 8.1 | 81.7 | 105 | +4 |
| 23 | 0.8 | 10.1 | 0.1 | 89.0 | 20 | +53 |
| 24 | 0.8 | 0.1 | 8.1 | 91.0 | 100 | +10 |

Compositions 13 to 19 inclusive are illustrative of compositions suitable as coating and laminating agents having superior laminating strength. In particular, it will be noted that compositions 13, 14, 15 and 19 are particularly preferable. Composition 20 demonstrates that if the extract distillate oil quantity is too low a totally inferior composition is produced. Composition 21 demonstrates that if insufficient quantity of low melting point microcrystalline wax and extract distillate oil are employed it is impossible to produce a satisfactory sheet coating or laminating composition. Composition 22 demonstrates the effect of employing too small quantities of isobutylene polymer and extract distillate oil. Composition 23 shows the effect obtained if the extract distillate oil is substantially absent from the composition. Composition 24 demonstrates the effect obtained if the low melting point microcrystalline wax is substantially absent from the composition. It is obvious from these data that compositions 22, 23 and 24 are unsuitable for use as coating or laminating agents.

The compositions of this example generally are somewhat darker than the compositions of Example I since the extract distillate oil employed is also somewhat darker. The compositions of this example generally have a color of about 3¼ as measured by the ASTM Method D-155.

The preferred compositions as illustrated in Examples I and II have been employed to coat paper, paperboard, cellophane, and similar sheet materials. They likewise have been employed to laminate cellophane to cellophane, cellophane to scrim, cellophane to glassine, cellophane to sulfite paper, sulfite paper to sulfite paper, and glassine to glassine. Sheet materials coated with the compositions of this invention have been found to have superior resistance to moisture and moisture vapor penetration and have retained flexibility to low temperatures. Laminated sheet materials similarly have been found to resist moisture penetration and to retain their flexibility to low temperatures. The coated sheet materials and laminated sheet materials have been found suitable for

I claim:

1. A sheet coating and laminating composition comprising from 63 weight percent to 86 weight percent based on the total weight of the composition of a microcrystalline wax having a melting point ranging from 170° F. to 185° F. combined with from 4.0 weight percent to 20.0 weight percent based on the total weight of the composition of a microcrystalline wax having a melting point ranging from 145° F. to 160° F. and from 10.0 weight percent to 17.0 weight percent based on the total weight of the composition of a low viscosity index selective solvent extract distillate oil comprised predominantly of alkylated aromatics, condensed ring aromatics and cycloparaffins and having a viscosity of from 1850 to 2500 Saybolt seconds Universal at 100° F. and from 80 to 100 Saybolt seconds Universal at 210° F., a viscosity index not in excess of about 25, and a pour point not in excess of about 15° F.

2. A sheet coating and laminating composition comprising from 61.4 weight percent to 85.6 weight percent based on the total weight of the composition of a microcrystalline wax having a melting point ranging from 170° F. to 185° F. combined with from 4.0 weight percent to 20.0 weight percent based on the total weight of the composition of a microcrystalline wax having a melting point ranging from 145° F. to 160° F., from 10.0 weight percent to 17.0 weight percent based on the total weight of the composition of a low viscosity index selective solvent extract distillate oil comprised predominantly of alkylated aromatics, condensed ring aromatics and cycloparaffins and having a viscosity of from 1850 to 2500 Saybolt seconds Universal at 100° F. and from 80 to 100 Saybolt seconds Universal at 210° F., a viscosity index not in excess of about 25 and a pour point not in excess of about 15° F. and from 0.4 weight percent to 1.6 weight percent based on the total weight of the composition of polyisobutylenes having an average molecular weight ranging from 117,000 to 135,000.

3. A sheet material having a coating consisting of the coating composition of claim 1.

4. A sheet material having a coating consisting of the coating composition of claim 2.

5. A laminated sheet material comprising at least two base sheets and a film of the wax composition of claim 1 intercalated therebetween.

6. A laminated sheet material comprising at least two base sheets and a film of the wax composition of claim 2 intercalated therebetween.

References Cited in the file of this patent

UNITED STATES PATENTS

| | | |
|---|---|---|
| 2,388,984 | Mack | Nov. 13, 1945 |
| 2,773,812 | Tench | Dec. 11, 1956 |
| 2,885,341 | Tench et al. | May 5, 1959 |

FOREIGN PATENTS

| | | |
|---|---|---|
| 210,034 | Australia | Sept. 5, 1957 |